United States Patent
Knox et al.

[11] Patent Number: 5,580,133
[45] Date of Patent: Dec. 3, 1996

[54] CAR SEAT RESTRAINT

[76] Inventors: Joe Knox; Debbie Knox, both of 7000 Fonvilla, Apt. 1805, Houston, Tex. 77074

[21] Appl. No.: 585,771

[22] Filed: Jan. 16, 1996

[51] Int. Cl.⁶ .......................... A47C 31/00; A47D 15/00; B60R 21/02
[52] U.S. Cl. .......................... 297/464; 297/482; 297/393; 297/397; 297/486; 297/182
[58] Field of Search .................................. 297/464, 482, 297/486, 182, 393, 397

[56] References Cited

U.S. PATENT DOCUMENTS

| | | |
|---|---|---|
| 4,025,111 | 5/1977 | Tanaka et al. |
| 4,570,974 | 2/1986 | Dove ................................... 297/464 X |
| 4,674,800 | 6/1987 | Ensign ................................ 297/464 X |
| 4,768,828 | 9/1988 | Kohketsu. |
| 4,776,049 | 10/1988 | Perron ................................. 297/393 X |
| 4,871,210 | 10/1988 | Alexander et al. |
| 4,953,816 | 9/1990 | Wilkinson ............................. 297/482 |
| 5,108,152 | 4/1992 | Reilly et al. ......................... 297/482 |
| 5,330,255 | 7/1994 | Stawicki .............................. 297/397 X |
| 5,339,472 | 8/1994 | Yin. |
| 5,439,008 | 8/1995 | Bowman. |

FOREIGN PATENT DOCUMENTS 2569966  3/1986  France ................................. 297/397

*Primary Examiner*—Peter M. Cuomo
*Assistant Examiner*—Rodney B. White
*Attorney, Agent, or Firm*—Richard C. Litman

[57] ABSTRACT

A restraint for a child car safety seat provides added assurance that a child, namely an active mobile toddler, is comfortably and securely maintained in the seat. The restraint slidably attaches to the shoulder straps of a conventional car seat, and is secured about the shoulders of the child keeping the shoulder straps in position above the shoulders. By maintaining the shoulder straps above the shoulders, the child is incapable of maneuvering or contorting, and escaping the car seat. The reduces the possibility of injuries to the child due to sudden stops, for example. The restraint also gives the driver of the vehicle the calm assurance that there will be no sudden surprises when the toddler appears in the rear view mirror.

4 Claims, 2 Drawing Sheets

CAR SEAT RESTRAINT

BACKGROUND OF THE INVENTION

1. Field of the Invention

The present invention relates to a car seat restraint. More particularly, the present invention relates to a car seat restraint used as a child safety device that a child from climbing out of a car seat.

2. Description of the Prior Art

For the safety of these children, all 50 of the United States have implemented child car seat statutes and regulations. Consequently, there are many car seat types available. Unfortunately, the various car seat types share a common problem. The problem resides in the mass production of car seats such that the car seats are made for general use, whereas each individual child has specific needs. Particularly, children in the toddler age range, namely nine months to three years, tend to be very active children; some are so active that a standard car seat with general use restraints will not contain the active child for any length of time.

Many patents have been issued for retraining or supporting children in car seats among other things. For instance U.S. Pat. No. 4,025,111, issued to Tanaka et al., discloses a harness arrangement for car seats allowing the adjustment of an abdominal pad for the safety and comfort of the child. U.S. Pat. No. 4,768,828, issued to Kohketsu, discloses a device for restraining a car seat in a car. U.S. Pat. No. 4,871,210, issued to Alexander et al., discloses a child high chair restraining device that requires a plurality of straps and connections for restraining a child in a high chair. U.S. Pat. No. 5,108,152, issued to Reilly et al., discloses a cushion device for child car seats that relieves irritation to the neck of a child due to rubbing action of the car seat straps. U.S. Pat. No. 5,339,472, issued to Yin, discloses a neck supporting pillow for infants that aids the weak neck muscles of an infant in maintaining the head in an erect position. U.S. Pat. No. 5,439,008, issued to Bowman, discloses a reflux restraint device having wedge-shaped pillow and a series of straps for holding an infant in a certain position lessening the opportunity for the stomach contents from being evacuated.

None of the above inventions and patents, taken either singly or in combination, is seen to describe the instant invention as claimed.

SUMMARY OF THE INVENTION

Applicants have found a long felt need unsatisfied by the state of the art car seats. Applicants' son, a very active and mobile toddler, found a way to contort his body and remove himself from the car seat. This became a hazard for driver, child and the car. Applicants searched for a solution to the dilemma of the car seat escape artist. When a suitable solution was unable to be found, applicants designed, developed, and tested the present invention on the most active child they knew of, theirs. Applicants found the car seat restraint of the present invention performed appropriately and without discomfort to the child.

Accordingly, it is a principal object of the invention to provide a car seat restraint.

It is another object of the invention to provide a car seat restraint that comfortably and safely restrains a child in a car seat.

It is a further object of the invention to provide a car seat restraint that present a child from contorting and escaping from a standard car seat harness without inhibiting the normal movement of the child.

Still another object of the invention is to provide a car seat restraint that is easily installed on various car seat harness types.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
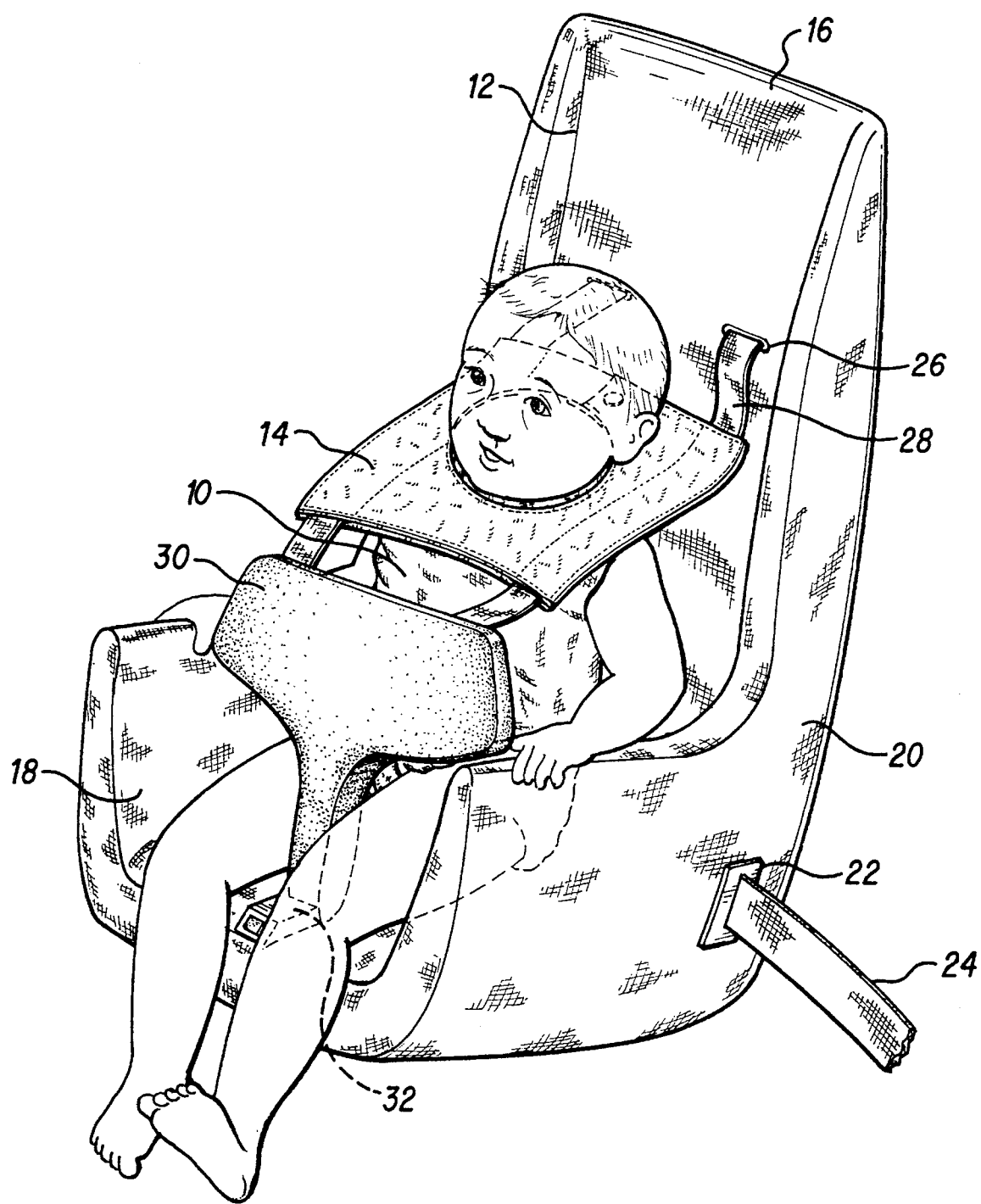
FIG. 1 is a perspective view of the present invention in use on a child car safety seat.

The present invention aids in restraining a child 10, typically a toddler in the age range of nine months to three years, within a child car safety seat 12. As shown in FIG. 1, the child 10 is protected, while traveling, by the child car safety seat 12. The child car safety seat 12 conventionally has a back portion 16 made of a synthetic resin, a seat portion 18 provided with side supports 20, and a window-like clearance 22 through which a seat belt 24 is passed. The back portion 16 is provided with a plurality of strap holes 26. A harness system, having an abdominal pad 30 and a pair of shoulder straps 28, is conventionally attached to the child car safety seat 12. Each of the shoulder straps 28, at one end thereof, is releasibly coupled to an anchoring member (not shown) in the rear of the back portion 16, and are passed through the strap holes 26 in the back portion 16. The other end of the shoulder straps 28 are permanently attached to the abdominal pad 30. The abdominal pad 30 couples to the seat portion 18 via a tongue and buckle arrangement 32.

The restraint 14 of the present invention aids the harness system because it eliminates the ability of the child 10 to maneuver or contort himself and thereby escape the harness. The restraint 14 is first slidably attached to the shoulder straps 28. Once the child 10 is place in the child car safety seat 12 and secured by the harness, the restraint 14 is then closed about the shoulders of the child 10 by a releasible connector (50, 52 see FIG. 2). The closing of the connector secures the restraint 14 about the shoulders of the child 10 and maintains the shoulder straps 28 over the shoulders of the child 10. The restraint 14 does not inhibit the ability of the child 10 to turn or move within the child car safety seat 12 because of the slidability of the restraint 14 along the shoulder straps 28.

Figure 2:
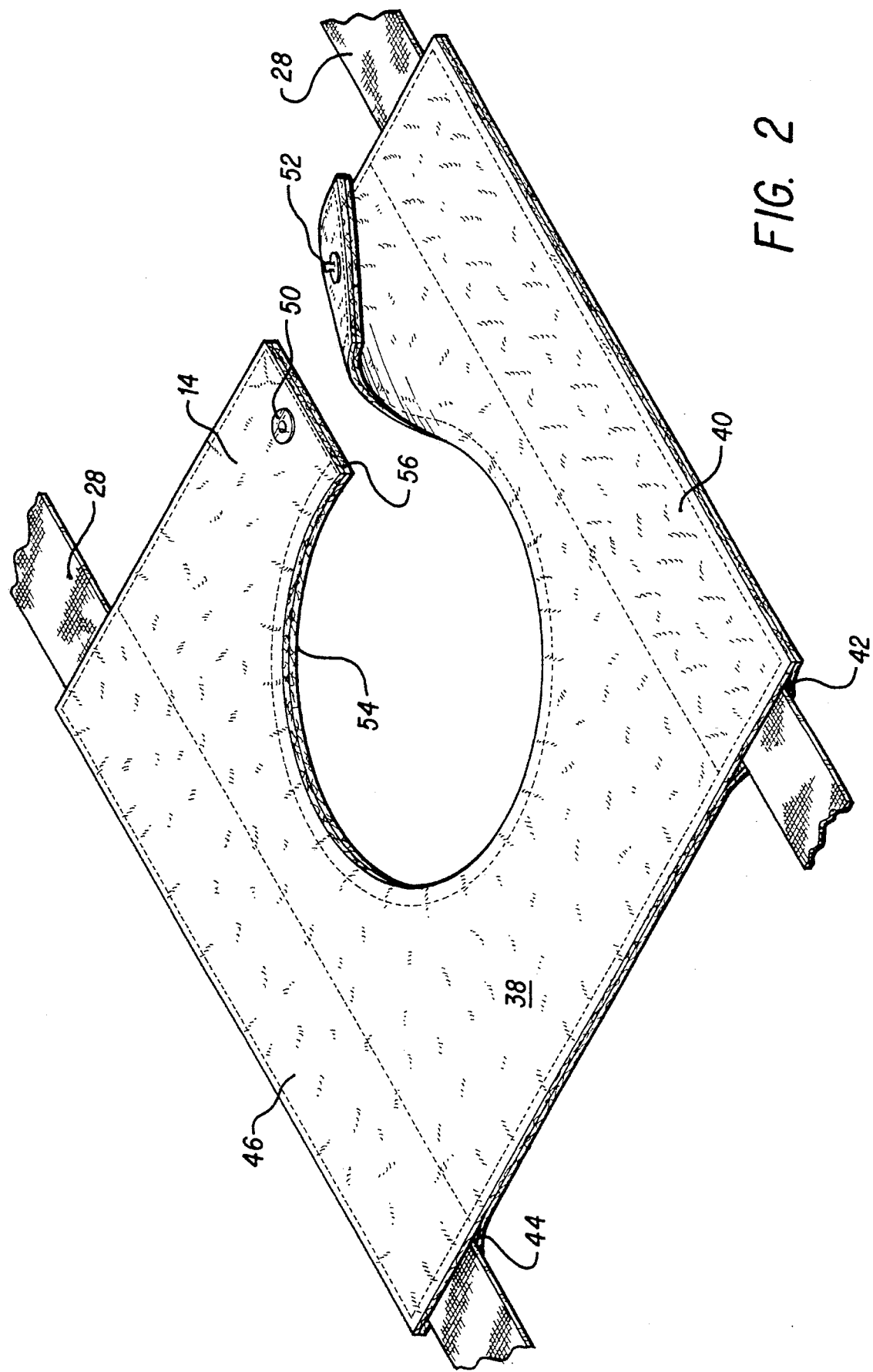
FIG. 2 is an enlarged perspective view of the present invention.

The restraint 14, as is more clearly shown in FIG. 2, is generally a flat rectangular soft material, such as a woven fabric. The restraint 14 has typically three sections, a central section 38, a first side section 40, and a second side section 46. The central section 38 has a generally circular opening 54 in the material. This opening 54 communicates with the outer edge of the material via a passageway 56. The passageway 56 has a closing member, preferably, a heavy duty snap closure. The snap closure has a first mating part 50 on one side of the passageway 56, and a second mating part 52 on the other side of the passageway 56. Other types of closing members are also useable in this invention, for example, hook and loop fasteners, such as Velcro®.

The first side section 40 and second side section 46 are identical, and parallel, but on opposite sides of the central section 38. Each side section 40, 46 forms a tubular through hole 42, 44, respectively, longitudinally through the material. Each of these tubular through holes 42, 44 slidably receives one of the shoulder straps 28. The restraint 14 and harness assemblage is accomplished by: releasing the shoulder straps 28 from the anchoring member; removing the shoulder straps 28 from the strap holes 26; sliding each shoulder strap 28 through each of the tubular through holes 42, 44 in each of the side sections 40, 46; and restoring each of the shoulder straps 28 through the respective strap hole 26 and to the respective anchoring member. The child car safety seat 12 with the restraint 14 in position readily receives the child 10 comfortably, and securely.

A child 10 secured in a child car safety seat 12 equipped with the restraint 14 of the present invention, will be unable to remove himself from the child car safety seat 12 because the circular opening 54 in the central section 38 is large enough to accommodate the neck of the child 10 comfortably, but will not allow the shoulders of the child 10 to pass through. The closing member 50, 52 allows the restraint 14 to be positioned about the shoulders of the child 10 when the harness is placed about the child 10. Once the closing member 50, 52 has been secured, it would be virtually impossible for the child 10 to reach behind his head and release the closing member 50, 52.

It is to be understood that the present invention is not limited to the sole embodiment described above, but encompasses any and all embodiments within the scope of the following claims.

We claim:

1. For use with a child safety car seat having a seat, a back and a pair of shoulder straps in a harness, a restraining device comprising:

a soft piece of material having a generally rectangular shape, and having a central section, a first side section on a side of said central section, and a second side section parallel to said first side section on an opposite side of said central section;

said central section having a generally circular opening formed therethrough and a releasable coupling communicating with said generally circular opening;

said first side section having a first tubular opening defined longitudinally therethrough; and said second side section having a second tubular opening defined longitudinally therethrough;

wherein each of the pair of shoulder straps is positioned within the said tubular openings of said first side section and said second side section, whereby said releasable coupling for securing said device about the shoulders of a child being harnessed in the child safety car seat, restraining the child within the harness.

2. The restraining device according to claim 1, said releasable coupling including a passageway extending from said generally circular opening to an outer edge of the central section, and closing means for releasably holding said passageway together.

3. The restraining device according to claim 2, said closing means are a snap closure.

4. A method for restraining a child in a child car safety seat, comprising the steps of:

providing a child car safety seat having a seat, a back and a pair of shoulder straps in a harness;

removing the shoulder straps from the harness;

providing a soft piece of material having a generally rectangular shape, and having a central section, a first side section on a side of said central section, and a second side section parallel to said first side section on an opposite side of said central section;

providing a generally circular opening formed through the central section and providing a releasable coupling communicating with the generally circular opening;

providing a first tubular opening defined longitudinally through the first side section;

providing a second tubular opening defined longitudinally through the second side section;

sliding one of each of the pair of shoulder straps within each of the first and second tubular openings;

restoring the shoulder straps to the harness;

placing a child in the child car safety seat;

securing the harness about the child to the seat;

securing the soft piece of material about the shoulders of the child by coupling the provided releasable coupling in back of the neck of the child, restraining the child within the child car safety seat.

* * * * *